Patented June 30, 1942

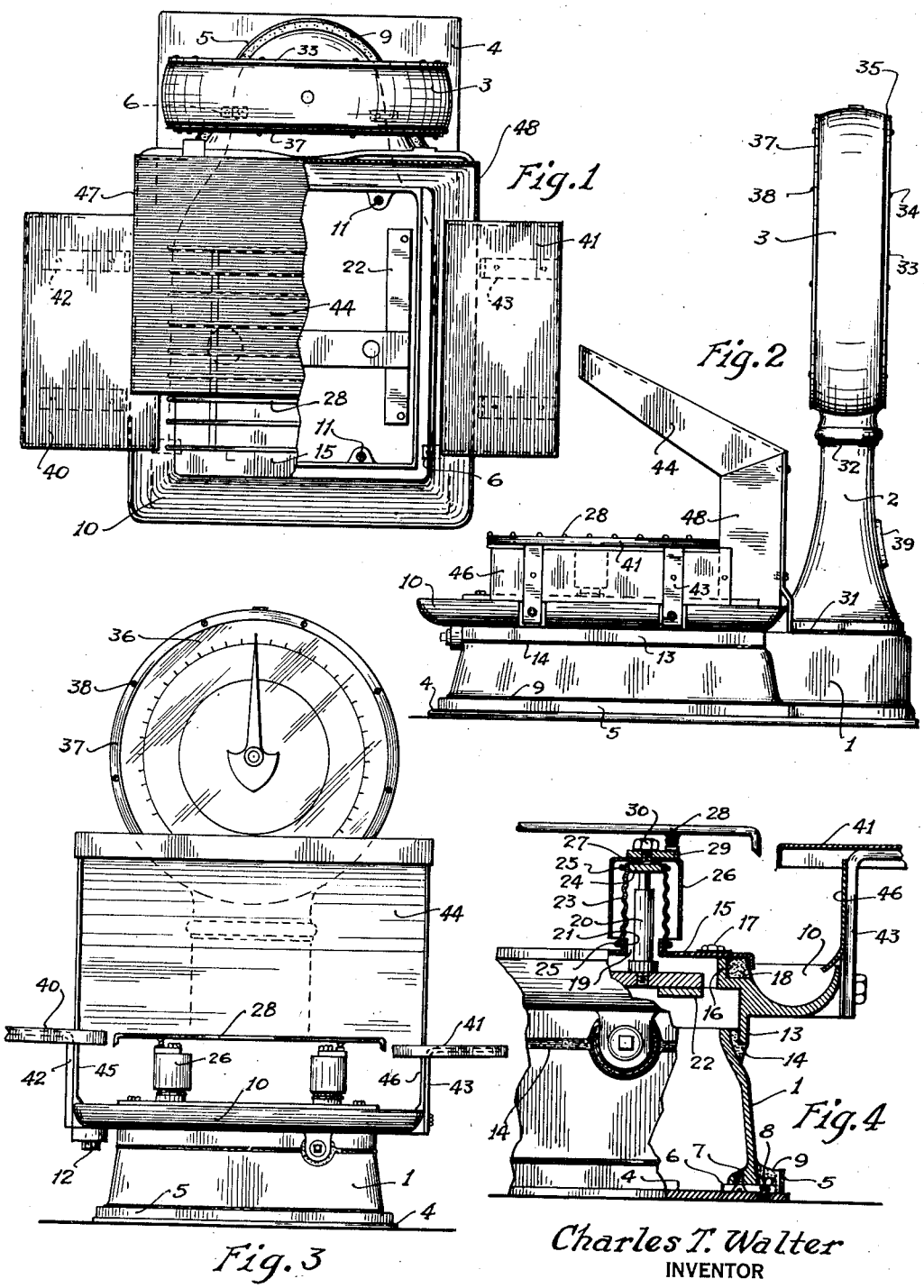

2,288,053

UNITED STATES PATENT OFFICE 2,288,053

SCALE SHIELD

Charles T. Walter, Chicago, Ill., assignor to Industrial Patents Corporation, Chicago, Ill., a corporation of Delaware Application November 7, 1939, Serial No. 303,280

5 Claims. (Cl. 265—27)

This invention relates to improvements in weighing scales.

In the use of weighing scales in locations where large quantities of water or moisture are present in the air, or where chemical vapors are present, much difficulty is experienced due to the corrosive action of the water vapor or chemical vapors which enter the scale housings. Corrosion of the elements of the scale changes the physical characteristics so that the scale requires frequent maintenance and cannot be depended upon as being accurate at all times.

One of the objects of this invention is to provide an improved means for hermetically sealing the working elements of a weighing scale.

Another object of this invention is to provide means for completely sealing the moving elements of a weighing scale from the external atmosphere.

Another object of this invention is to provide a weighing scale which is particularly adapted for use in pumping curing pickle into meat, such as hams and the like.

Other objects and advantages of this invention will become apparent from the description and claims which follow.

In the drawing, similar reference characters in the several figures are used to indicate similar elements.

Figure 1 is a plan view of a scale manufactured in accordance with the present invention.

Figure 2 is a side elevational view of the scale of Figure 1.

Figure 3 is a front elevational view of the scale of Figures 1 and 2.

Figure 4 is an elevational view, partly in section, and at a larger scale, of a portion of the weighing scale.

The scale which is illustrated in the drawing is particularly adapted for measuring and controlling the amount of curing pickle which is pumped into meat, such as hams. The scale comprises a hollow base 1, column 2, and scale face housing 3. The scale is mounted on a base plate 4 which is provided with an upstanding flange 5. Flange 5 may be integral with base plate 4 or may be welded to the base plate. Mounting clips 6 are secured to base 1 by means of screws 7, four such mounting clips being illustrated in the drawing. The mounting clips 6 and base 1 are secured to base plate 4 by means of bolt 8. The annular space between the lower edge of base 1, flange 5, and base plate 4 is filled with a thermoplastic material 9, for example, asphalt, to form a vaporproof and water-tight seal.

An annular trough 10, which may be formed of cast metal, is secured to the open top of base 1 as by means of bolts 11 and completely surrounds the base. The trough is provided with a drain 12 through which excess curing pickle may be returned to the brine supply. The trough is provided with a depending skirt 13, which is adapted to fit loosely over the upper end of base 1. The annular space between the depending skirt 13 and base 1 is filled with a thermoplastic material 14, such as asphalt, to provide a vaporproof and moistureproof seal.

A cover plate 15 is secured to upwardly projecting flange or inner wall 16 of trough 10 by means of bolts 17. To insure vaporproof and waterproof seal around bolts 17, a rubber washer or gasket is placed between the head of the bolts 17 and the surface of cover plate 15. The space between marginal portions of cover plate 15 and flange 16 is filled with a thermoplastic material 18, such as asphalt, to form a vaporproof and waterproof seal.

Cover plate 15 is provided with one or more apertures 19, through which the push rods or grill studs 20 project. The apertures are defined by upwardly projecting flanges 21, which may be integral with cover plate 15 or may be formed of inset sleeves. Studs 20 are secured to scale levers 22 within base 1. The number of studs and, therefore, the number of apertures 19 which must be provided in cover plate 15 depends upon the construction of the scale. In the scale illustrated in the drawing, two such studs are provided; however, it is to be understood that the number of studs varies with different scales.

A flexible bellows 23, for example, a thin metallic bellows or preferably a thin rubber bellows encompasses each of the push rods and is tightly bound at its lower end to flange 21 and at its upper end to shoulder 24 of studs 20. The rubber bellows, for example, may be securely bound to flange 21 and shoulder 24 by means of wire 25. A bell-shaped shield 26 is placed on stud 20. A rubber gasket 27 may first be placed on the shoulder 24 to insure a tight seal between the top of the shield and shoulder 24. The shield encompasses the bellows and serves to protect the bellows from external forces.

I prefer to replace the conventional weighing pan with a grill 28. The grill is formed of transverse and longitudinal rods which are preferably welded together at their points of juncture. Brackets 29 are secured to the transverse rods of the grill as by welding. The grill is mounted upon grill studs 20 by means of the brackets 29 which are secured to the studs 20 by means of nuts 30. It is apparent that by substituting a grill for the conventional weighing platform, there is no opportunity for liquids to remain on the weighing platform and affect the weight indicated by the scale. For example, in the use of this construction in pumping curing pickle into hams, the excess pickle may run onto cover plate 15 and into trough 10 without affecting the weight indicated by the scale mechanism.

Plastic seals 9, 14, and 18, and flexible bellows 23 provide a vaporproof and waterproof seal for the scale base. The junction between base 1 and column 2 is also provided with a plastic seal 31 to form a vaporproof and waterproof seal between the base and column.

Likewise the junction between column 2 and scale face housing 3 is provided with a plastic seal 32 to provide a vaporproof and waterproof seal between these elements. The rear of the scale face housing is generally closed by means of a plate 33, which is secured to the housing by means of screws 34. A soft rubber gasket 35 is preferably placed between the scale face housing and plate 33 and the screws 34 then drawn up tightly. If desired, a plastic may also be placed around the periphery of the disk to cover the gasket, and a plastic may also be placed about each of the screws 34 to insure an absolutely vaporproof and waterproof joint.

The forward side of scale face housing 3 is closed by means of a transparent cover plate 36 which is secured to the housing by means of a ring 37 and screws 38. A rubber gasket may be placed between scale face housing 3 and cover plate 36 and between the cover plate and ring 37, and the ring then drawn up tightly by means of screws 38. A vaporproof and waterproof seal may also be provided by applying a plastic around the periphery of the ring 37 and cover plate 36, allowing the plastic to extend to the scale face housing 3. Plastic may also be placed around screws 38 to insure that no leakage will take place around the screws.

Any other seams or joints are preferably covered or sealed with a plastic material, for example, hand hole cover 39 in column 2 may be covered with a plastic or thermoplastic material to insure that no leakage will occur at this point.

Shelves 40 and 41 are mounted on trough 10 at either side of the grill 28. Shelf 40 is supported by brackets 42, which are secured to trough 10. Shelf 40 is preferably sloped slightly toward the grill, the end adjacent grill 28 being preferably at about the same level as grill 28. The sloping shelf provides means for supporting the ham while the operator inserts the pumping or hypodermic needles through which the brine is pumped into the ham before the ham is transferred onto grill 28. Shelf 41 is supported by means of brackets 43, which are secured to trough 10. Shelf 41 is mounted a small distance below the normal level of grill 28 so that the ham, after having had the required amount of pickle pumped into it, may be easily transferred from the grill onto shelf 41. Shelf 41 provides a convenient position at which the hypodermic needles may be withdrawn from the ham after completion of the pumping operation.

A splash hood 44 may be mounted at the rear edge of trough 10. Plates 45 and 46 are secured above trough 10 to brackets 42 and 43, respectively, and extend to the side walls 47, and 48 of splash hood 44. The plates 45 and 46, and splash hood 44 confine the excess pickle and any pickle accidentally discharged to a small area and prevent splashing or splattering of the pumping pickle. A splash hood is provided particularly to prevent the curing pickle to be discharged over the transparent cover plate, should the hypodermic needles become accidentally withdrawn from the ham during the pumping operation.

Curing pickle which may run from the ham either during the pumping operation while the ham is on the scale grill 28, or while it is on either shelf 40 or shelf 41, will flow into trough 10. If the hypodermic needles become accidentally withdrawn from the ham during the pumping operation, the discharged curing pickle will strike the splash hood and flow into trough 10. The curing pickle may be returned to the brine supply through drain 12 of trough 10, or may be discharged into a sewer line if desired.

It is apparent that in the use of the scale for use in pumping curing pickle into hams, the curing pickle is corrosive and the shelves, grill, splash hood, and trough are preferably formed of corrosion-resistant materials or are provided with a coating of corrosion-resistant materials.

I have found that scales protected or constructed in the manner described, when used in ham curing cellars in which the curing pickle is pumped into the ham, will remain unimpaired and retain their accuracy over long periods of time. Scales protected in accordance with my invention may be employed under these adverse conditions without requiring replacement of parts or overhauling for about the same period of time that an unprotected scale may be employed in dry atmospheres.

I claim:

1. A scale for determining the weight of articles that may have fluids dripping therefrom, the scale having a weighing system and including indicating means, a sealed housing for enclosing said system and said indicating means, a weighing platform for supporting the article to be weighed, said platform comprising an open grill work, connecting means extending through said housing, said connecting means being secured between said platform and said weighing system to transmit the weight to be measured to said system, said connecting means thus being movable with the system and platform which have relative motion with respect to the housing when an article is placed on the platform, and a flexible sealing means sealed to said housing and said connecting means, said grill platform being provided so that excess liquids may drain rapidly from the articles whereby the influence of this excess fluid upon the weighing system is removed, and said flexible seal being provided so that all fluids draining from the platform will flow down the outside of said housing.

2. A scale for determining the weight of articles that may have fluids dripping therefrom, the scale having a weighing system and including indicating means, a sealed housing for enclosing said system and said indicating means, said housing having a drain gutter around it, a weighing platform for supporting the article to be weighed, said platform comprising an open grill work disposed above said housing, connecting means extending through said housing, said connecting means being secured between said platform and said weighing system to transmit the weight to be measured to said system, said connecting means thus being movable with the system and platform which have relative motion with respect to the housing when an article is placed on the platform, and a flexible sealing means sealed to said housing and said connecting means, said grill platform being provided so that excess liquids may drain rapidly from the articles whereby the influence of this excess fluid upon the weighing system is removed, said flexible seal being provided so that all fluids draining from the platform will flow down the outside of said housing, and said gutter serving to collect the fluids drained from said article.

3. A scale for determining the weight of articles that may have fluids dripping therefrom, the scale having a weighing system and including indicating means, a sealed housing for enclosing said system and said indicating means, a weighing platform for supporting the article to be weighed, said platform comprising an open grill work, connecting means extending through said housing, said connecting means being secured between said platform and said weighing system to transmit the weight to be measured to said system, said connecting means thus being movable with the system and platform which have relative motion with respect to the housing when an article is placed on the platform, and a flexible sealing means sealed to said housing and said connecting means, a rigid shield fixedly supported on said connecting means to cover said flexible seal, said grill platform being provided so that excess liquids may drain rapidly from the articles whereby the influence of this excess fluid upon the weighing system is removed, and said flexible seal being provided so that all fluids draining from the platform will flow down the outside of said housing.

4. A scale for determining the weight of articles that may have fluids dripping therefrom, the scale having a weighing system and including indicating means, a sealed housing for enclosing said system and said indicating means, said housing having a drain gutter around it, a weighing platform for supporting the article to be weighed, said platform comprising an open grill work disposed above said housing, connecting means extending through said housing, said connecting means being secured between said platform and said weighing system to transmit the weight to be measured to said system, said connecting means thus being movable with the system and platform which have relative motion with respect to the housing when an article is placed on the platform, and a flexible sealing means sealed to said housing and said connecting means, a rigid shield fixedly supported on said connecting means to cover said flexible seal, said grill platform being provided so that excess liquids may drain rapidly from the articles whereby the influence of this excess fluid upon the weighing system is removed, said flexible seal being provided so that all fluids draining from the platform will flow down the outside of said housing, and said gutter serving to collect the fluids drained from said article.

5. A scale for determining the weight of articles that may have materials dropping therefrom, the scale having a weighing system and including indicating means, a sealed housing for enclosing said system and said indicating means, a weighing platform for supporting the article to be weighed, connecting means extending through said housing, said connecting means being secured between said platform and said weighing system to transmit the weight to be measured to said system, said connecting means thus being movable with the system and platform which have relative motion with respect to the housing when an article is placed on the platform, and a flexible sealing means sealed to said housing and said connecting means, said platform having a plurality of openings therein, the area immediately surrounding each opening being inclined downwardly toward said opening, the spacing of said openings and the inclination of said areas being such that said areas are substantially adjacent whereby the platform provides an article supporting surface substantially free of horizontal areas so that the material dropping from said articles will pass through the openings and will not be retained by the platform whereby the influence of this dropping material upon the weighing system is removed, and said flexible seal being provided so that all materials dropping from the platform will be excluded from said housing.

CHARLES T. WALTER.